Aug. 11, 1936.  W. N. THATCHER  2,050,978
METHOD FOR INTRODUCING ANTIKNOCK FUELS INTO INTERNAL COMBUSTION ENGINES
Filed June 30, 1932
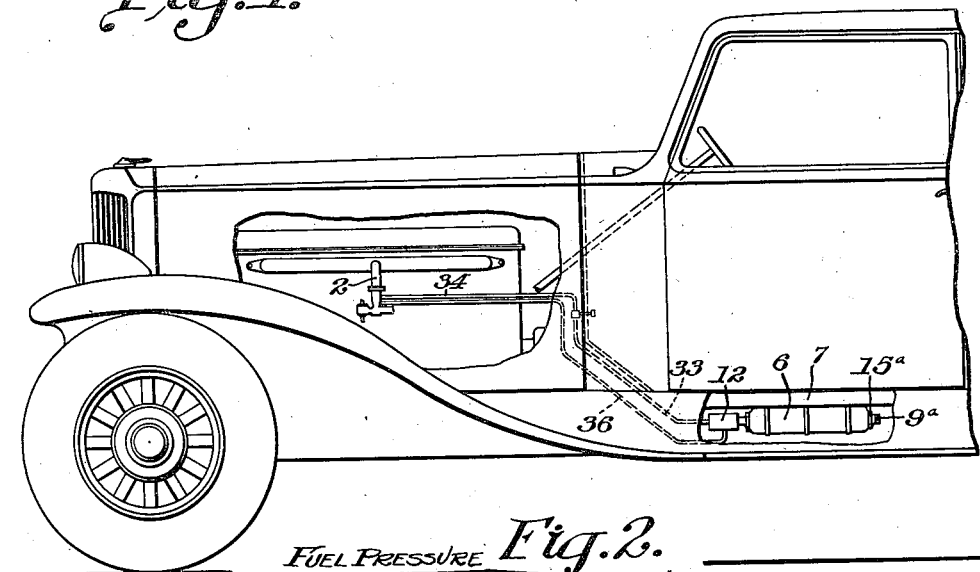
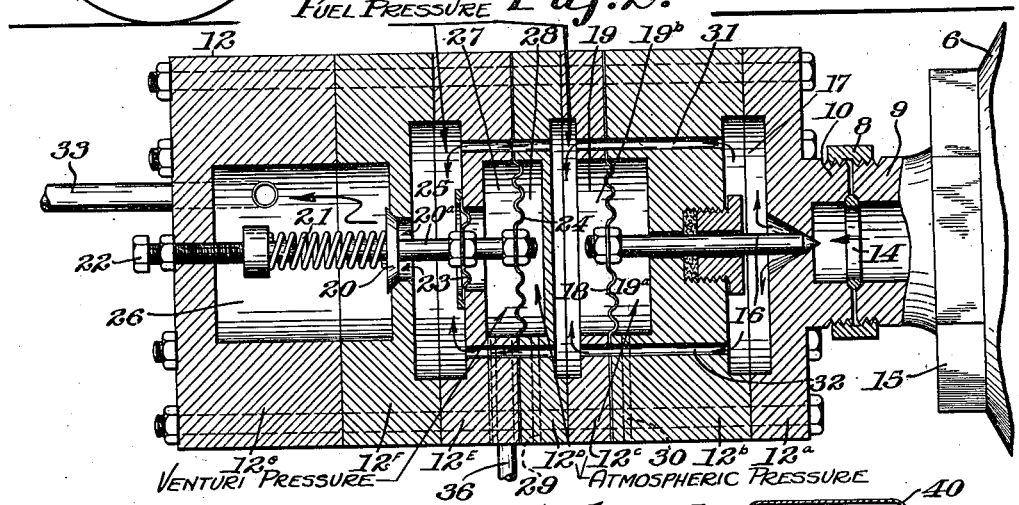
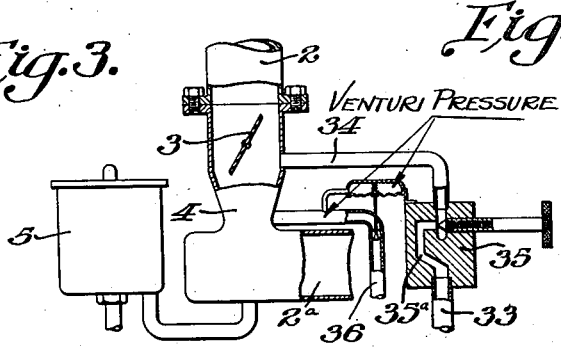
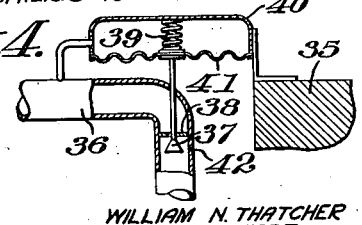
WILLIAM N. THATCHER
INVENTOR
BY R. J. Dearborn
HIS ATTORNEY Patented Aug. 11, 1936

2,050,978

UNITED STATES PATENT OFFICE 2,050,978

METHOD FOR INTRODUCING ANTIKNOCK FUELS INTO INTERNAL COMBUSTION ENGINES

William N. Thatcher, North Tarrytown, N. Y., assignor to The Texas Company, New York, N. Y., a corporation of Delaware Application June 30, 1932, Serial No. 620,165

7 Claims. (Cl. 123—121)

This invention relates to a fuel for internal combustion engines and to the method and apparatus for utilizing the same.

The tendency in modern automobile engine design is to increase the compression ratio to constantly higher points for increasing the efficiency of operation of the engine. The increase in the compression ratio has created new requirements in the fuel consumed in order to avoid pre-ignition and engine knock.

According to the present invention it is proposed to add a limited quantity of hydrocarbon materials having high anti-knock qualities to commercial gasoline for increasing the concentration of these materials above that which commercial gasoline possesses. Materials suited for this purpose are the two normally gaseous members of the methane series of hydrocarbons between pentane and ethane, namely butane or propane, although iso-butane, which is also normally in a gaseous state, can be utilized effectively within the invention. Since these materials are present in a gaseous state under normal atmospheric conditions, it is preferred to introduce the anti-knock material directly into the fuel line of the engine above the point of atomization of the commercial fuel employed. The introduction of a limited quantity of this gaseous fuel into the intake pipe permits the material to be immediately dispersed through the atomized particles of fuel flowing through the pipe, with the result that when the fuel reaches the engine it contains a substantially uniform supply of the anti-knock material, uniformly dispersed throughout the charge, under any fixed throttle condition and engine speed.

Apparatus suitable for introducing the anti-knock material into the engine is shown in the drawing, wherein Fig. 1 is a partial elevational view of a motor vehicle supplied with my invention;

Figs. 2 and 3 are enlarged sectional views of the devices employed for supplying the anti-knock material;

Fig. 4 is an enlarged detail view of a portion of the pressure control devices employed.

The engine is shown as supplied with the usual intake pipe 2 provided with a butterfly-type throttle valve 3 and a restricted portion 4 constituting a venturi in which the usual liquid fuel supplied from the constant level chamber 5 is broken up or atomized into relatively fine particles by the air stream passing through the venturi from the air supply pipe 2a. These devices are of any usual or preferred type and specifically constitute no part of the present invention.

The supply of propane or butane, maintained under relatively high pressure, is contained within the drum 6 secured to the automobile chassis frame 7 and held in place by suitable clamps or other devices, so that it can be readily removed and a filled drum substituted. The forward end of the drum 6 is connected to the valve block 12 by means of a double screw threaded nut 8 having its opposite ends reversely threaded for engagement respectively with the outlet or neck 9 of the drum and with a corresponding neck 10 on the valve block 12. The connection at 8 may be made fluid-tight by the use of a metallic or other sealing washer 14. The usual drum valve, which may be controlled by the rotatable nut 15, is employed so that the material cannot escape from the drum until this valve has been opened after the drum has been assembled on the car. A similar neck 9a and valve 15a may be formed on the rearward end of the drum, if preferred, to permit the drum to be refilled without removing from the car.

For convenience of manufacture and assembly the valve block 12 is made up of a number of sections 12a, 12b, 12c, 12d, 12e, 12f and 12g, secured together as by means of the longitudinal bolts shown. The main control of the pressure of the issuing gases is accomplished through the shiftable needle valve 16 mounted in a packing gland in the block section 12b and having the point positioned to close the passage from the cylinder into the valve chamber 17. The stem of the needle valve is secured to a flexible diaphragm 18 which extends across the chamber 19 for closing communication between the chamber portions 19a and 19b. A secondary control valve 20 is provided for controlling the flow of propane or butane from the chamber 25 into the outlet chamber 26 communicating with the intake pipe of the engine. This valve is normally pressed toward closed position by means of a spring 21, the strength of the spring being variable through adjustment of the supporting bolt 22. The valve stem 20a extends through the control chamber 27 and is connected to the two diaphragms 23 and 24 to be controlled in its movements by the combined pressures on these diaphragms, modified by the influence of the spring 21. Diaphragm 23 is only slightly larger than the inner face of valve 20 and serves to neutralize the pressure on the valve face. Chamber 28, which communicates with the outer face of the diaphragm 24, is subjected to atmospheric pressure by means of the passage 29. Chamber 19a likewise communicates with the outside air through the restricted passage 30. The valve block is formed with a plurality of fluid conducting passages 31 and 32 leading from the valve chamber 17 into the diaphragm chamber 19b and chamber 25 for conducting fluid through the valve casing and for equalizing the pressures in the several chambers.

Communication is established between the outlet chamber 26 and the intake pipe 2 by means of the tubes 33 and 34, the latter entering the intake pipe at a point near the throttle valve 3, but outwardly of the same as respects the fuel flow, so as to inject the propane or butane directly across the stream of atomized fuel passing the throttle valve. The wall of the tube 33 is made of sufficient thickness to withstand, if necessary, the maximum pressure of the anti-knock fuel in the drum 6.

In order to permit the ready adjustment of the maximum quantity of anti-knock material passing into the intake pipe, a manually controlled needle valve 35 is preferably employed, so constructed as to be adjustable to close the passage 35a to a greater or less degree, as will be readily understood. The valve 35 also permits complete closure of the passage 35a when, for example, the addition of any anti-knock material is unnecessary, and it is for this reason that the pipe 33 is made of relatively heavy material, as shown.

In order to render the device responsive to the reduction of pressure in the intake pipe, it is preferred to employ a control tube 36 for placing the control chamber 27 in communication with the interior of the intake pipe beneath throttle valve 3 and preferably at the restricted portion of the venturi 4, as shown.

The pipe 36 may be supplied with a valve 37, movable to or from the valve seat 38 and normally held in open position by the relatively weak adjustable spring 39. The stem of the valve is connected to the central movable portion of the diaphragm 41 mounted on the casing 40, the interior of casing 40, above diaphragm 41 communicating with the pipe 36 above the valve 37 for subjecting the diaphragm at all times to the reduction of pressure in the pipe 36. A small pin hole or leak 42 is preferably placed in the pipe 36 beneath the valve 37 for slowly dissipating any reduction of pressure therein after the valve is closed.

In the operation of the apparatus after the charged fuel supply drum 6 has been attached to the valve casing and valve 15 moved to open position, the gaseous material passes from the drum into the valve casing and occupies the various chambers 17, 19b and 25 as indicated by the arrows. Needle valve 16 is opened initially by the issuing gas, this effect being facilitated by the atmospheric pressure in chamber 19a. The maximum possible pressure in the valve casing is reached when the pressure in the chamber 19b overcomes the pressure of the issuing gas and the atmospheric pressure in the chamber 19a and the needle valve 16 is thereupon moved to closed position. Thereafter the needle valve is moved to or from closed position, dependent upon the passage of the propane or butane from the valve casing. If the engine is at rest, the intake pipe contains substantially atmospheric pressure which is communicated through the control pipe 36 to the diaphragm chamber 27, thereby maintaining atmospheric pressure on both faces of diaphragm 24. The pressure of the gas in the chamber 25, assisted by the strength of the spring 21, thus maintains the valve 20 closed when the engine is not in operation. When the engine is running under idling conditions and the throttle valve 3 is substantially closed there is insufficient reduction of pressure in the intake pipe to operate the control valves and the same condition is maintained, escape of the gas being prevented. When, however, the throttle valve 3 is opened the reduction of pressure in the intake pipe is conveyed through the pipe 36 to the chamber 27, the reduction of pressure in this chamber permitting the atmospheric pressure on the outer face of diaphragm 24 to move the diaphragm to position to open valve 20. A constant flow of anti-knock gaseous material is thus provided from the drum 6 through the valve casing 12 and supply pipes 33 and 34, to the intake pipe 2. This flow is limited by the restricted passages and valves, including the manually adjustable valve 35, so that only a limited quantity of the anti-knock material is introduced into the fuel vapors.

Experiment has shown that with high engine speed there is little or no tendency of the engine to knock. The valve 37 and diaphragm 38 are provided for the purpose of closing the passage through the pipe 36 under these conditions, the closure of valve 37 causing the chamber 27 to be slowly subjected to atmospheric pressure, through the leak 42. The valve 20 is accordingly maintained closed until the engine speed is reduced when the anti-knock material will again be supplied to the intake pipe, provided other appropriate conditions are maintained.

With this method of operation, under conditions when the anti-knock material is most needed, as during hill climbing with a moderate engine speed and relatively wide open throttle, the proportion of propane or butane admitted can be regulated to be just sufficient to avoid fuel knock in the engine. Under more favorable operating conditions of the engine, as during high driving speed, the anti-knock material is not required and is not supplied.

With the proper adjustments of the apparatus the gaseous fuel can be utilized for facilitating the starting of the engine, since the reduction of pressure in the intake pipe when the engine is operated by the starting devices will permit the passage of a small quantity of the gaseous fuel directly into the intake pipe and combustion chambers. The gaseous state of the propane or butane tends to make the starting of the engine easier, particularly under adverse conditions, as in extremely cold weather.

It is to be understood that various modifications may be made in the apparatus without departing from the spirit of the invention, as set forth in the appended claims.

I claim:

1. The method of operating an internal combustion engine comprising feeding a fuel obtained by atomizing commercial gasoline with an air stream utilized for carrying said gasoline into the combustion chamber of the engine and, upon the pressure in the fuel intake pipe outwardly of the throttle valve being reduced to a predetermined point, mixing with said fuel a normally gaseous hydrocarbon fuel having high anti-knock qualities.

2. The method of operating an internal combustion engine comprising feeding a fuel obtained by atomizing commercial gasoline with an air stream utilized for carrying said gasoline into the combustion chamber of the engine and, upon the pressure in the fuel intake pipe outwardly of the throttle valve being reduced to a predetermined point, mixing with said fuel a normally gaseous hydrocarbon fuel having high anti-knock qualities in quantities varying directly with said reduction in pressure.

3. The method of operating an internal combustion engine comprising feeding a fuel obtained by atomizing commercial gasoline with an air stream utilized for carrying said gasoline into the combustion chamber of the engine and, upon the pressure in the fuel intake pipe outwardly of the throttle valve being reduced to a predetermined point, mixing with said fuel a normally gaseous hydrocarbon fuel having high anti-knock qualities in quantities such that at the normal pressures in said intake pipe the gaseous fuel forms an appreciable part of the fuel supplied to the engine.

4. The method of operating an internal combustion engine comprising feeding a fuel obtained by atomizing commercial gasoline with an air stream utilized for carrying said gasoline into the combustion chamber of the engine and, upon the pressure in the fuel intake pipe outwardly of the throttle valve being reduced to a first predetermined point, mixing with said fuel a normally gaseous hydrocarbon fuel having high anti-knock qualities in quantities varying directly with the pressure in said intake pipe until the said pressure reaches a second predetermined point at which time the supply of said gaseous fuel is cut off.

5. The method of operating an internal combustion engine having an intake pipe and throttle valve comprising feeding a fuel which will knock at low engine speed and high compression into said intake pipe and controlling said fuel through regulation of said throttle valve and introducing a regulated quantity of normally gaseous hydrocarbon material having high anti-knock qualities into the fuel passing through said intake pipe, controlling the admission of said gaseous material through variation in the pressure obtaining in said intake pipe outwardly of said throttle valve and of cutting off the flow of said gaseous fuel when said pressure reaches a predetermined point.

6. The method of operating an internal combustion engine comprising starting the engine on a fuel obtained by atomizing commercial gasoline with an air stream utilized for carrying said gasoline into the combustion chamber of the engine and thereafter, upon the pressure in the fuel intake pipe outwardly of the throttle valve being reduced to a predetermined point, mixing with said fuel during a predetermined intermediate pressure range a normally gaseous hydrocarbon fuel having high anti-knock qualities.

7. The method of operating an internal combustion engine comprising starting the engine on a fuel obtained by atomizing commercial gasoline with an air stream utilized for carrying said gasoline into the combustion chamber of the engine and thereafter, upon the pressure in the fuel intake pipe outwardly of the throttle valve being reduced to a first predetermined point, mixing with said fuel a normally gaseous hydrocarbon fuel having high anti-knock qualities in quantities varying directly with the pressure in said intake pipe until the said pressure reaches a second predetermined point at which time the supply of said gaseous fuel is cut off.

WILLIAM N. THATCHER.